(12) United States Patent
Raper

(10) Patent No.: US 8,035,513 B2
(45) Date of Patent: Oct. 11, 2011

(54) WIRELESS VARIABLE ILLUMINATION LEVEL LIGHTING SYSTEM

(75) Inventor: William C. Raper, Bowling Green, KY (US)

(73) Assignee: HeathCo LLC, Bowling Green, KY (US)

( * ) Notice: Subject to any disclaimer, the term of this patent is extended or adjusted under 35 U.S.C. 154(b) by 31 days.

(21) Appl. No.: 11/550,564

(22) Filed: Oct. 18, 2006

(65) Prior Publication Data
US 2008/0106407 A1 May 8, 2008

(51) Int. Cl.
*G08B 13/00* (2006.01)
*H05B 37/02* (2006.01)

(52) U.S. Cl. ............... 340/541; 340/545.2; 340/552; 340/555; 340/556; 340/615; 340/635; 340/636.1; 340/641; 315/149; 315/150; 315/157; 315/158; 315/159

(58) Field of Classification Search ............ 340/545.2, 340/541, 552, 555, 556, 615, 635, 636.1, 340/641, 565; 315/149, 150, 157, 158, 159; 362/221
See application file for complete search history.

(56) References Cited

U.S. PATENT DOCUMENTS

| | | | |
|---|---|---|---|
| 5,291,020 A | 3/1994 | Lee | |
| 5,598,066 A | 1/1997 | Wiesemann et al. | |
| 5,673,022 A * | 9/1997 | Patel | 340/565 |
| 5,747,937 A | 5/1998 | Wiesemann et al. | |
| 6,225,748 B1 | 5/2001 | Evans et al. | |
| 6,276,814 B1 | 8/2001 | Gough | |
| 6,909,239 B2 | 6/2005 | Gauna | |
| 6,933,678 B2 | 8/2005 | Kuo | |
| 6,989,759 B2 | 1/2006 | Johler et al. | |
| 7,575,338 B1 * | 8/2009 | Verfuerth | 362/221 |
| 2004/0047153 A1 | 3/2004 | Lee | |
| 2004/0122930 A1* | 6/2004 | Pasternak | 709/223 |
| 2005/0276051 A1 | 12/2005 | Caudle et al. | |
| 2006/0170548 A1* | 8/2006 | Leen | 340/545.2 |
| 2007/0273539 A1* | 11/2007 | Gananathan | 340/615 |

* cited by examiner

*Primary Examiner* — George Bugg
*Assistant Examiner* — Sisay Yacob
(74) *Attorney, Agent, or Firm* — Fitch Even Tabin & Flannery

(57) ABSTRACT

A sensor circuit for remotely commanding the operation of a remote device includes a motion sensor circuit for detecting motion relative thereto and having an output conditioned upon motion detection. Additionally, a photocell sensor circuit for detecting a low ambient illumination level has an output command conditioned upon the detection of a predetermined illumination level that is electrically coupled to a control circuit having a plurality of inputs. The invention further includes a data output comprising a remote device operation command and a transmitter circuit coupled to the data output of said control circuit for transmitting said operation command to a remote device.

39 Claims, 3 Drawing Sheets

US 8,035,513 B2

WIRELESS VARIABLE ILLUMINATION LEVEL LIGHTING SYSTEM

BACKGROUND OF THE INVENTION

The present invention relates generally to a security or outdoor lighting system and more specifically to a lighting system capable of activating remote lamps at a plurality of illumination levels based upon a plurality of sensed parameters including motion and ambient light level as sensed by a plurality of sensors.

DESCRIPTION OF THE RELATED ART

Electrical controls utilizing photosensitive sensors have been employed in a wide variety of applications where it is necessary or desirable to activate a light source responsive to sensed ambient light. Additionally, some controls incorporate concomitant motion sensors for activating a light based upon sensed movement proximate a motion sensor. In these systems, it is often desirable to sense the amount of ambient light as a precondition for light activation based on a motion event, since there is no need to turn on a security light, for example, in broad daylight.

One difficulty with these prior art systems is the necessity for turning on a security light in one location when motion is detected or sensed in another location. As one example, in a residential setting, a homeowner may want to turn on a security light located on or near the front or back door of the house when motion is sensed at a point proximate the driveway. In prior art systems, a remote sensor would be physically wired to interact with a switching system to activate the necessary lamps. Where these systems involve more than one sensor or more than one lamp, the wiring necessary to operate the system can be difficult and costly to install, particularly in existing structures where wiring must be routed without disturbing landscaping and the like.

SUMMARY OF THE INVENTION

The present invention provides a sensor circuit capable of controlling the operation of a remote device such as a light or switch based upon a plurality of sensed parameters such as ambient light and motion. The invention utilizes a motion sensor circuit that may include a passive infrared sensor (PIR) and associated signal conditioning circuitry to provide a signal representative of a motion event proximate the PIR sensor to an control circuit. The control circuit or other logic circuit, for example an application specific integrated circuit (hereinafter ASIC), may be suitably programmed with logic instructions to provide a concomitant data output to actuate a lamp conditioned upon a plurality of conditions.

The invention further comprises a photocell circuit that provides an output to the control circuit representative of a low ambient light level on a photocell, whereby the lamp output may be conditioned upon a dusk or night event. A dusk timer and on timer circuit are also electrically connected to the control circuit to provide a user with the ability to condition the lamp output based upon a plurality of timer variables.

Additionally, the invention includes an addressing circuit that may incorporate a second ASIC to provide a data word having address and data components to an RF transmitter circuit to command operation of a suitably equipped remote device. The data component may include a lamp on bit and one or more dim bits to permit the operation of remote lamp at a plurality of power levels.

Other objects, features and advantages of the present invention will become apparent upon inspection of the detailed description of the preferred embodiments herein below taken in conjunction with the drawing Figures.

BRIEF DESCRIPTION OF THE DRAWING FIGURES

DETAILED DESCRIPTION OF THE PREFERRED EMBODIMENT(S)

Figure 1:
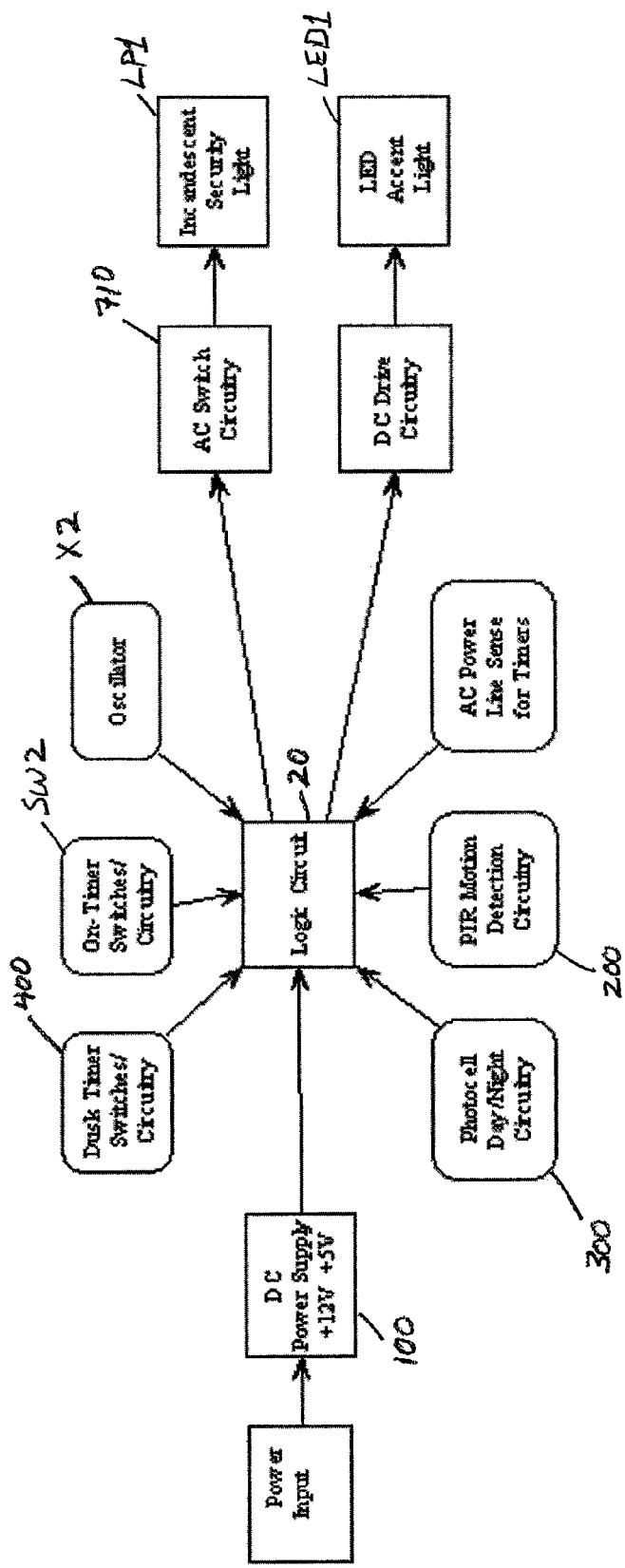
FIG. 1 is a block diagram of a wireless illumination system in accordance with one embodiment of the present invention.
Figure 2:
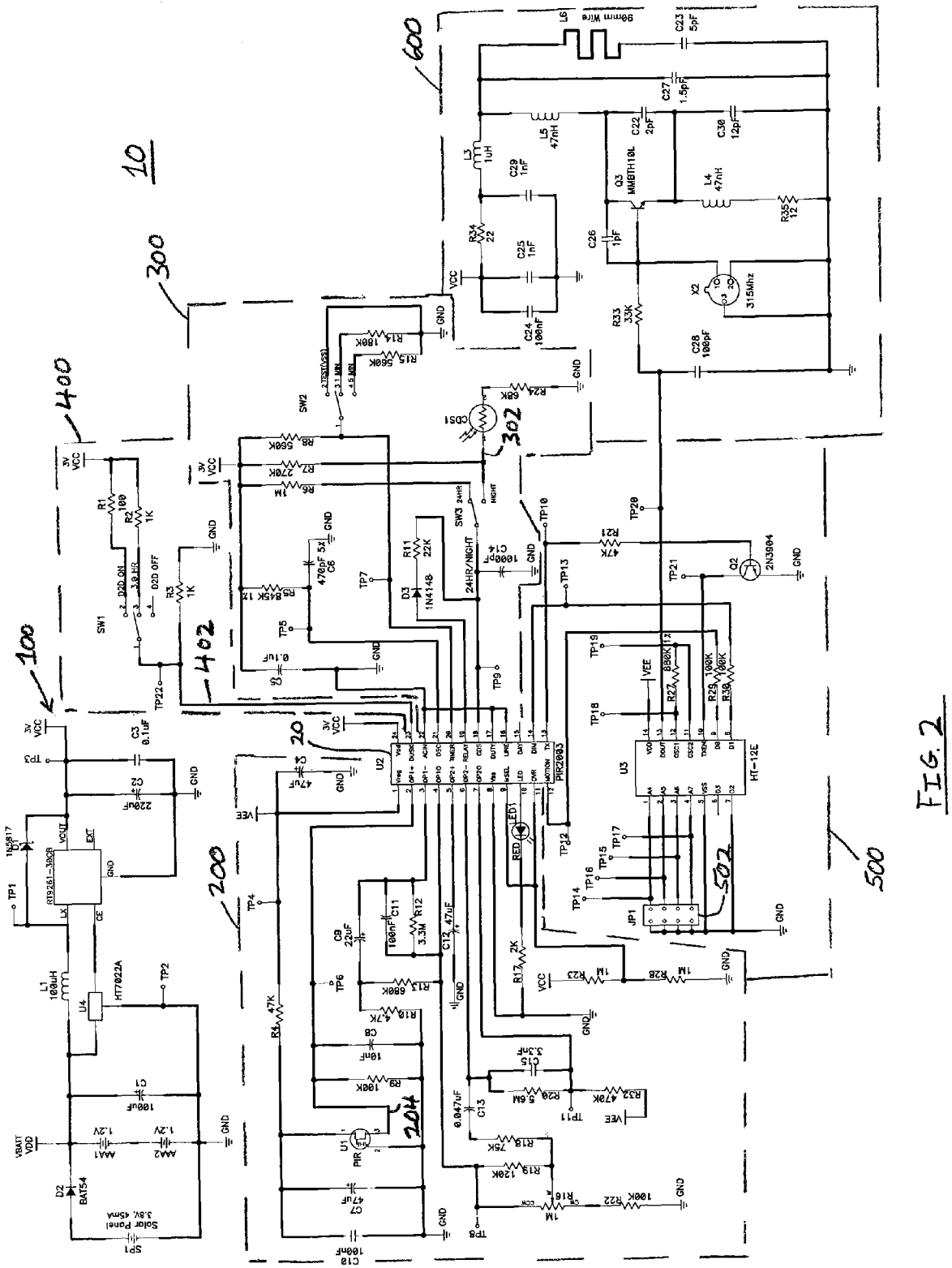
FIG. 2 is an electrical schematic of a circuit for detecting motion and ambient light and sending a remote command responsive thereto in accordance with one embodiment of the present invention.

Referring now to FIGS. 1 and 2, and in accordance with a preferred constructed embodiment of the present invention, a sensor circuit 10 capable of controlling remote operation of a device such as a light or switch includes a control circuit 20, shown in an exemplary fashion as an application specific integrated circuit (ASIC) U2 having a plurality of input and output pins for accepting a plurality of inputs and outputs as discussed further herein below. While the ASIC U2 shown in FIG. 2 is specifically designed to operate efficiently in the various embodiments of the invention disclosed, it is recognized that a wide variety of commercially available integrated circuits, microprocessors or programmable logic controllers may be implemented as control circuit 20 without departing from the spirit or scope of the present invention.

A power supply circuit 100 includes a direct current voltage source Vdd, for example a conditioned AC voltage source, a plurality of conventional 1.2 v batteries AAA1 and AAA2 respectively, connected in series, and alternatively a solar panel SP1 connected in parallel with batteries AAA1 and AAA2 for supplying DC power to a solid state regulator 102 via an inductor L1. Power supply circuit 100 provides a constant 3 volts of direct current power Vcc for the operation for sensor circuit 10 of the current invention.

The sensor circuit 10 further comprises a motion sensor circuit 200 which may include a PIR (passive infrared) sensor U1 that is capable of sensing infrared radiation over a predetermined field of view and producing an output signal 204 responsive of a threshold infrared radiation level. Output signal 204 is thus representative of a motion event within the range of detection of PIR sensor U1 and is electrically coupled to an input pin OP1+ of ASIC U2. Pins OP1+ and OP1− are the non-inverting and inverting input pins of an operational amplifier circuit integral to ASIC U1 that provides signal amplification and noise filtration for PIR sensor signal 204. A variety of motion sensors may be used in conjunction with sensor circuit 200, for example ultrasonic sensors or other pyroelectric type sensors.

Sensor circuit 10 further comprises a photocell circuit 300 including a photocell CDS1 having an output signal 302 representative of a predetermined level of ambient light impinging on sensor CDS1. Output signal 302 is electrically coupled to the CDS pin of ASIC U2 through a two position 24 hour/night only switch SW3. Where SW3 is set to the twenty-four hour position a signal is always provided to the CDS pin through resistor R7 such that logic circuit 20 is enabled to produce an appropriate output no matter the ambient light conditions. Where SW3 is set to the "night" position, a signal is provided to the CDS pin of ASIC U2 only when photocell CDS 1 switches off due to the absence of ambient light at or near dusk.

Additionally, a dusk timer circuit 400 provides a dusk timer output signal 402 to a DUSK pin of ASIC U2 to indicate to logic circuit 20 how long the logic circuit should actuate an assigned output after night is detected by photocell CDS1. Dusk timer circuit 400 includes three position switch SW1 for varying the length of time the assigned output is on after night is detected. When switch SW1 is in the D2D position (the "dusk-to-dawn" position) the DUSK input pin is connected to VCC through resistor R1, thereby supplying a signal 402 voltage representative of actuating the assigned output for the entire night. When SW1 is in the 3.0 hour position, the DUSK input pin is connected to VCC through resistor R1 thereby supplying a signal 402 voltage representative of actuating the assigned output for three hours after night is detected. When SW1 is in the off position, no signal 402 is provided to the DUSK pin, thereby inhibiting operation of the dusk timer circuit.

Photocell circuit 300 further comprises an on-timer switch SW2 having a plurality of switch positions that enable the manual selection of the amount of time an assigned output should be actuated conditioned upon the position of SW2. As shown in FIG. 2, SW2 includes a test position, a 1 minute position, and a 5 minute position. In the test position, SW2 connects a TIME pin of U2 to ground thereby enabling the actuation of the assigned output for an indefinite duration when any motion event is detected by PIR sensor U1. Similarly, the 1 minute and 5 minute timer positions of SW2 permit the assigned output to be actuated for one and five minutes respectively upon the sensing of a motion event by PIR U1.

While switches SW1 and SW2 are depicted in FIG. 2 as three position switches, it is to be understood that these are exemplary embodiments only, and that switches having a greater number of switch positions and concomitant resistors may be employed to provide a plurality of dusk timer intervals and on timer intervals without departing from the scope of the present invention.

As shown in FIG. 2, the sensor circuit 10 of the present invention may further comprise an addressing circuit 500 that accepts a plurality of input signals from ASIC U2 and provides a data output signal DOUT to enable remote operation of a device based upon the sensed parameters of PIR sensor U1, photocell CDS1, dusk timer circuit 400 and photo cell circuit 300. Addressing circuit 500 comprises an address/data ASIC U3 for accepting dim, motion, and transmit signals from ASIC U2 and transmitting a data string representative thereof to a remote receiving device 700, shown in FIG. 3.

Addressing circuit 500 includes a plurality of address jumper switches 502 shown in FIG. 2 as jumper block JP1, that are electrically connected to a plurality of address inputs at pins A4-A7, respectively, of ASIC U3. Address jumper switches 502 are used to connect address input pins A4-A7 to electrical ground thereby representing a receiving device 700 data address. Although jumper block JP1 is shown in FIG. 2 as a four jumper switch 502 device, it is readily understood that a wide variety of switching and data addressing systems may be incorporated into the addressing circuit 500 of the invention without departing from the scope thereof.

ASIC U3 further comprises a transmit enable TXEN, electrically connected to a transmit output TX of ASIC U2 though transistor Q2. Accordingly, when ASIC U2 sets transmit output TX high, a signal is received at the transmit enable input TXEN that indicates to ASIC U3 that data should be transmitted to receiving device 700, as will be discussed further herein below.

ASIC U3 further includes a dim input D1 that is electrically connected to a dim output DIM of ASIC U2, which is intended to provide a data signal to the receiving device 700 to operate a lamp 702 at a dim or partial illumination level. Additionally ASIC U3 further comprises a motion input D0 that is electrically connected to a motion output of ASIC U2, which is a data signal that provides a data output to ASIC U3 to inform receiving device 700 to turn on lamp 702 responsive to a motion event sensed through PIR sensor circuit 200.

Finally ASIC U3 includes a data output signal DOUT that comprises a plurality of address bits for addressing a specific remote receiving device 700 and a plurality of data bits to command specific actions of receiving device 700. In one embodiment of the present invention, the plurality of data bits include an on/off bit that indicate that a lamp (or other remote device) should be turned on. A second data bit is a dim data bit indicative of a lamp output at a reduced illumination level when the dim data bit is set high. A third data bit may be a panic bit whereby a user may supply a panic signal, either remotely of directly to panic input pin D2 of ASIC U3 thereby indicating to remote receiving device 700 to flash lamp 702 at predetermined intervals. Finally, a fourth data bit may be included to indicate that the transmitting device is either a motion sensor or alternatively, a handheld remote. This data bit is controlled by setting pin D3 of ASIC U3. While this exemplary embodiment of the present invention employs four data bits for transmission to receiving device 700, one of ordinary skill will appreciate that a wide variety of data structures may be employed without departing from the scope of the present invention.

The present invention further comprises an RF data transmission circuit 600 electronically connected to data output DOUT of addressing circuit 500 for wireless transmission of address and data to receiving apparatus 700. RF transmission circuit 600 comprises a SAW oscillator XZ operating at, for example, 315 MHz to transmit an RF signal including the aforementioned data and address bits to a remote device via antenna L6. Although RF transmitter circuit 600 is shown in FIG. 2 as an exemplary apparatus for wireless data transmission, a variety of RF circuits may be employed in conjunction with the present invention.

In operation, ASIC U2 is provided with suitable resident programming instructions to enable the DIM output to be set high whenever switch SW1 is in the 3.0 HR or "dusk-to-dawn" positions, and remain high for either three hours after photocell circuit 300 detects the absence of illumination indicative of dusk, or from that point until photocell circuit 300 once again detects daylight. The MOTION output of ASIC U2 is set high whenever PIR sensor circuit 200 detects a motion event.

Additionally, where 24 hour/night switch SW3 is set to the 24 hour position, the motion output of ASIC U2 is set high any time motion is detected by PIR sensor circuit 200. Where the 24 hour/night switch SW3 is set to the night position, the MOTION output of ASIC U2 is prohibited from going high until photocell circuit 300 provides an output signal 302 indicative of night to the CDS input pin of ASIC U2.

The transmit output TX of ASIC U2 is set to high whenever the DIM or MOTION outputs change thereby providing a signal to the transmit enable TXEN input of addressing ASIC U3 via transistor Q2.

Figure 3:
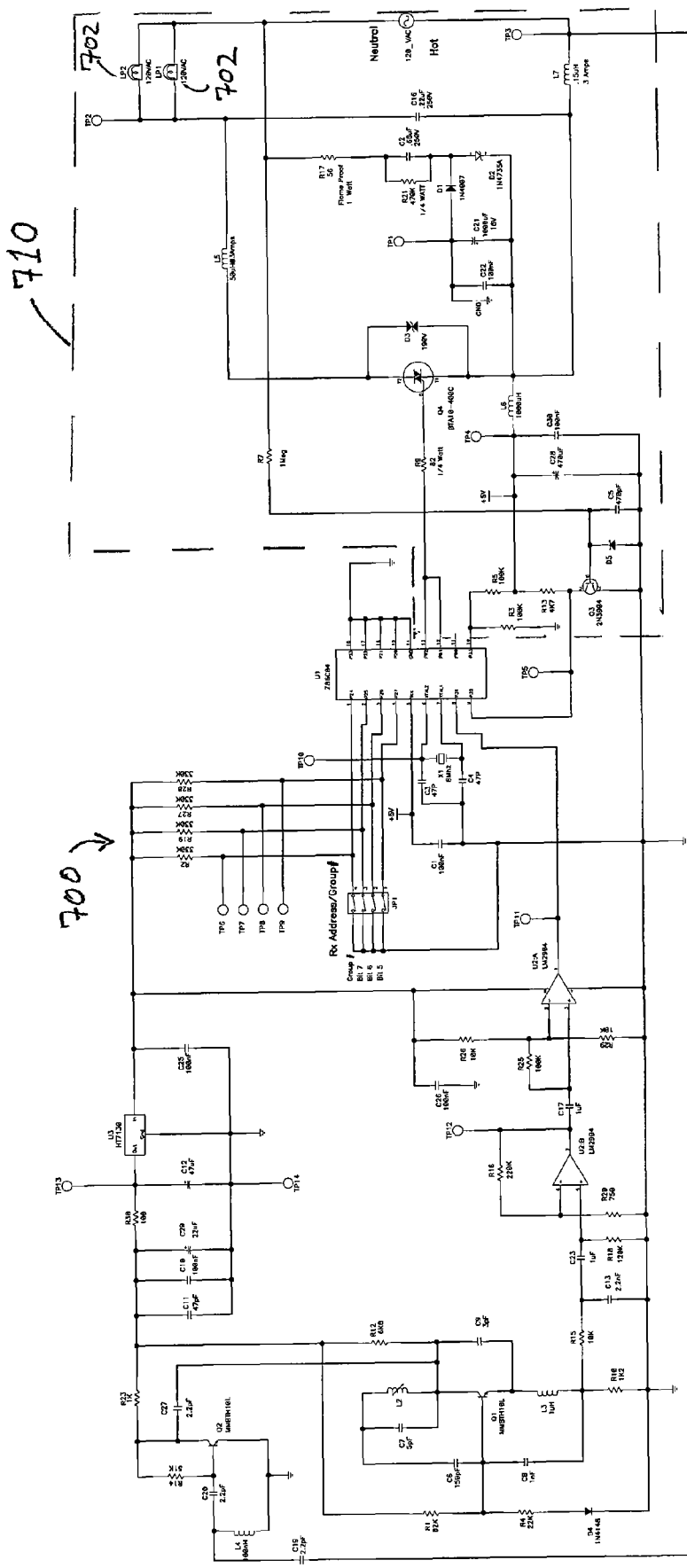
FIG. 3 is an exemplary external device to be activated in accordance with one embodiment of the present invention.

As can be seen in FIG. 3, the remote device 700 includes a lamp output circuit 710 that provides AC current to lamps LP1 and LP2 through operation of triac Q4 and inductor L5. The remote device 700 further comprises an ASIC U1 that accepts as an input at P31 the data signal from RF transmitter circuit 600. When the dim data bit is set high, ASIC U1 fires triac Q4 at a reduced rate, thereby providing for a reduced illumination level from lamps LP1 and LP2.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. An apparatus configured to operate a plurality of lamps at a plurality of illumination levels, the apparatus comprising:
   a plurality of lamps;
   a plurality of sensor circuits, individual circuits of the plurality of sensor circuits configured to operate at least one of the plurality of lamps independently of others of the plurality of sensor circuits and independent of control by a common controller for the plurality of sensor circuits, individual sensor circuits comprising:
      a motion sensor which detects motion and which effects motion sensor signals responsive to detecting motion, the motion sensor signals effective to set intensity levels of the at least one of the plurality of lamps via a remote operation command;
      a photocell sensor which detects a low ambient illumination level and effects photocell sensor signals responsive to the detection of light, the photocell sensor signals being effective to set the intensity levels of the at least one of the plurality of lamps via the remote operation command;
      a transmitter circuit which wirelessly transmits the remote operation command to the at least one of the plurality of lamps responsive to the motion sensor signals and the photocell sensor signals, the command being transmitted via a wireless unidirectional communication link from the transmitter circuit to the at least one of the plurality of lamps;
      the remote operation command comprising an instruction to cause light emitted from the at least one of the plurality of lamps to occur at one of a plurality of light illumination intensity levels upon illumination of the at least one of the plurality of lamps, and
      at least one motion sensor signal and at least one photocell sensor signal configured to operate the at least one of the plurality of lamps independently of the other, the photocell sensor signal affecting the intensity of the illumination level of the at least one of the plurality of lamps irrespective of whether the motion detector sends a signal upon detection of motion.

2. An apparatus claimed in claim 1 wherein each sensor circuit further comprises:
   a control circuit operatively coupled to the photocell sensor and the motion sensor, the control circuit providing the remote operation command for transmission by the transmitter circuit.

3. An apparatus claimed in claim 1 wherein said instruction comprises an on/off data bit and a bright/dim data bit for commanding a plurality of illumination levels of the at least one of the plurality of lamps.

4. A sensor circuit for remotely operating a lamp at a plurality of illumination levels, the sensor circuit comprising:
   a motion sensor circuit comprising a motion sensor which detects motion and which effects motion sensor signals responsive to detecting the motion and being effective to set intensity levels of the lamp via a remote operation command;
   a photocell sensor circuit comprising a photocell sensor which detects a low ambient illumination level and effects photocell sensor signals responsive to the detection of light and being effective to set intensity levels of the lamp via the remote operation command;
   a control circuit having a remote operation command capable of commanding dim or bright lamp operation responsive to the motion sensor signals and photocell sensor signals;
   a wireless transmitter which wirelessly transmits the remote operation command to the lamp responsive to the motion sensor signals and the photocell sensor signals, the command being wirelessly transmitted via a unidirectional communication link from the wireless transmitter to the lamp;
   the remote operation command comprising an instruction to cause the illumination of the lamp to occur at one of a plurality of illumination intensity levels upon illumination of the lamp, and
   at least one of the photocell sensor signals controlling an intensity of light being illuminated from the lamp and at least one motion sensor signal affecting whether the lamp is energized to emit light, the at least one photocell sensor signal controlling the intensity of light being emitted from the lamp regardless of whether the motion sensor circuit detects motion and sends the motion sensor signal, the at least one photocell sensor signal effecting the intensity level of light being emitted from the lamp independently from the at least one motion sensor signal.

5. A sensor circuit for remotely operating a lamp as claimed in claim 4 wherein said instruction comprises an on/off data bit and a dim/bright data bit for commanding a plurality of illumination levels of said lamp.

6. A circuit for remotely operating a lamp at a plurality of illumination levels, the circuit comprising:
   motion sensor means which detects motion and which effects motion sensor signals responsive to detecting motion, the motion sensor signals being effective to set intensity levels of the lamp via a remote operation command;
   illumination sensor means which detects a low ambient illumination level and effects photocell sensor signals responsive to the detection of light, the photocell sensor signals being effective to set intensity levels of the lamp via the remote operation command;
   transmitter means operatively coupled to the motion sensor means and the illumination sensor means which wirelessly transmits the remote operation command to the lamp responsive to the motion sensor signals and the photocell sensor signals, the command being wirelessly transmitted via a unidirectional communication link from the transmitter means to the lamp;
   the remote operation command comprising an instruction to cause the illumination of the lamp to occur at one of a plurality of illumination intensity levels upon illumination of the lamp, and
   at least one of the photocell sensor signals controlling an intensity of light being illuminated from the lamp and at least one motion sensor signal affecting whether the lamp is energized to emit light, the at least one photocell sensor signal controlling the intensity of light being emitted from the lamp regardless of whether the motion detector detects motion and sends the motion sensor signal, the at least one photocell sensor signal effecting the intensity level of light being emitted from the lamp independently from the at least one motion sensor signal.

7. A sensor circuit for remotely commanding the operation of a device, the sensor circuit comprising:
- a motion sensor circuit which detects motion and which effects motion sensor signals responsive to detecting motion, the motion sensor circuit having an output for transmitting the motion sensor signals, the motion sensor signals being effective to set intensity levels of the device via a device operation command;
- a photocell sensor circuit which detects a low ambient illumination level and effects photocell sensor signals responsive to the detection of light, the photocell sensor circuit having an output which transmits the photocell sensor signals, the photocell sensor signals being effective to set intensity levels of the device via the device operation command;
- a control circuit having a plurality of inputs coupled to the motion sensor circuit output and the photocell sensor circuit output and having at least one data output comprising the device operation command;
- a transmitter circuit coupled to the data output of the control circuit which wirelessly transmits the device operation command to the device responsive to the motion sensor signals and the photocell sensor signals, the command being wirelessly transmitted via a unidirectional communication link from the transmitter circuit to the device;
- the device operation command comprising an instruction to cause the illumination of the device to occur at one of a plurality of illumination intensity levels upon illumination of the device, and
- at least one of the photocell sensor signals controlling an intensity of light being illuminated from the device and at least one motion sensor signal affecting whether the device is energized to emit light, the at least one photocell sensor signal controlling the intensity of light being emitted from the device regardless of whether the motion sensor detects motion and sends the motion sensor signal, the at least one photocell sensor signal effecting the intensity level of light being emitted from the device independently from the at least one motion sensor signal.

8. A sensor circuit as claimed in claim 7 further comprising a dusk timer circuit having a plurality of selectable operation modes coupled to an input of said control circuit.

9. A sensor circuit as claimed in claim 8 wherein the operation modes of the dusk timer circuit comprise an on mode signal whereby the control circuit conditions the device operation command upon the presence of an on mode signal and photocell sensor signal of the photocell sensor circuit.

10. A sensor circuit as claimed in claim 8 wherein the operation modes of said dusk timer circuit comprise a timer mode signal whereby said control circuit conditions said device operation command upon said output of said motion sensor circuit for a predetermined time period.

11. A sensor circuit as claimed in claim 10 wherein said timer mode signal is selectable by a user.

12. A sensor circuit as claimed in claim 7 wherein said sensor circuit further comprises a device address selector coupled to an input of said control circuit, wherein the data output thereof includes said device address therein.

13. A sensor circuit as claimed in claim 12 wherein said device address selector comprises a plurality of dip switches.

14. A sensor circuit as claimed in claim 7 wherein said device operation command further comprises at least on power level data bit.

15. A sensor circuit as claimed in claim 14 wherein said device is a lamp and wherein said at least one power level data bit indicative of a lamp illumination level.

16. A sensor circuit as claimed in claim 7 wherein said data output further comprises at least one sensor type data bit.

17. A sensor circuit as claimed in claim 16 wherein said sensor type data bit is representative of a manually operated sensor, an automated sensor, or a manually controlled remote transmitter device.

18. A sensor circuit as claimed in claim 7 further comprising an ON timer circuit having an output coupled to an input of said control circuit, wherein the output of
said ON timer circuit is representative of the length of time said device operation command remains on in the event of motion detection by said motion sensor circuit.

19. A sensor circuit as claimed in claim 7 further comprising a 24 hour/night switch for decoupling said photocell sensor circuit from said control circuit, whereby said device operation command is conditioned only upon said motion sensor circuit detecting motion.

20. A sensor circuit as claimed in claim 7 further comprising a power supply circuit having at least one source of direct current power coupled thereto, said power supply circuit configured to supply operation power to said sensor circuit.

21. A sensor circuit as claimed in claim 14 wherein said data output is transmitted to said remote device when any data bit therein changes.

22. A sensor circuit as claimed in claim 7 wherein said transmitter circuit comprises a radio frequency transmitter.

23. A sensor circuit as claimed in claim 7 wherein said motion sensor circuit comprises a PIR sensor.

24. A sensor circuit as claimed in claim 7 wherein said motion sensor circuit comprises an ultrasonic sensor.

25. A sensor circuit as claimed in claim 7 wherein said control circuit comprises a microprocessor.

26. A sensor circuit as claimed in claim 7 wherein said control circuit comprises an application specific integrated circuit.

27. An apparatus for remotely commanding the operation of at least one lamp, the apparatus comprising:
- a control circuit having a plurality of signal inputs and a data output;
- a motion sensor circuit which detects motion and which effects motion sensor signals responsive to detecting motion, the motion sensor circuit having an output which transmits the motion sensor signals, the motion sensor circuit coupled to one of the signal inputs of the control circuit, the motion sensor signals being effective to set intensity levels of the at least one lamp via an instruction;
- a photocell sensor which detects a low ambient illumination level and effects photocell sensor signals responsive to the detection of light and which has an output which transmits the photocell sensor signals, the photocell sensor coupled to one of the signal inputs of the control circuit, the photocell sensor signals being effective to set intensity levels of the at least one lamp via the instruction;
- a transmitter having an input coupled to the data output of the control circuit and which wirelessly transmits a radio frequency output signal representative of the data output to the at least one lamp responsive to the motion sensor signals and the photocell sensor signals, the radio frequency output signal being wirelessly transmitted via a unidirectional communication link from the transmitter circuit to the at least one lamp;

a receiver having an input for receiving the radio frequency output signal and varying power to the at least one lamp conditioned upon the radio frequency output signal;

the radio frequency output signal comprising the instruction to cause the illumination of the at least one lamp to occur at one of a plurality of illumination intensity levels upon illumination of the at least one lamp, and at least one of the photocell sensor signals controlling an intensity of light being illuminated from the at least one lamp and at least one motion sensor signal affecting whether the at least one lamp is energized to emit light, the at least one photocell sensor signal controlling the intensity of light being emitted from the at least one lamp regardless of whether the motion sensor circuit detects motion and sends the motion sensor signal, the at least one photocell sensor signal effecting the intensity level of light being emitted from the at least one lamp independently from the at least one motion sensor signal.

28. An apparatus as claimed in claim 27 wherein said motion sensor circuit comprises a PM sensor.

29. An apparatus as claimed in claim 27 wherein said motion sensor circuit comprises an ultrasonic sensor.

30. An apparatus as claimed in claim 27 wherein said control circuit comprises a microprocessor.

31. An apparatus as claimed in claim 27 wherein said control circuit comprises an application specific integrated circuit.

32. A security light comprising:
a lamp; and
a circuit configured to operate the lamp at a plurality of illumination levels, the circuit comprising:
a motion sensor which detects motion and which effects motion sensor signals responsive to detecting motion, the motion sensor signals being effective to set intensity levels of the lamp via a remote operation command;
a photocell sensor which detects a low ambient illumination level and effects photocell sensor signals responsive to the detection of light, the photocell sensor signals being effective to set intensity levels of the lamp via the remote operation command; and
a transmitter circuit which wirelessly transmits the remote operation command to the lamp responsive to the motion sensor signals and the photocell sensor signals, the command being wirelessly transmitted via a unidirectional communication link from the transmitter circuit to the lamp;
the remote operation command comprising an instruction to cause the illumination of the lamp to occur at one of a plurality of illumination intensity levels upon illumination of the lamp,
the motion sensor and the photocell sensor having at least one operational parameter that is directly programmed at the security light and not remotely programmed from a device remote from the security light, and
at least one of the photocell sensor signals controlling an intensity of light being illuminated from the lamp and at least one motion sensor signal affecting whether the lamp is energized to emit light, the at least one photocell sensor signal controlling the intensity of light being emitted from the lamp regardless of whether the motion sensor detects motion and sends the motion sensor signal, the at least one photocell sensor signal effecting the intensity level of light being emitted from the lamp independently from the at least one motion sensor signal.

33. The circuit of claim 1 wherein at least one of the plurality of illumination intensity levels is reached incrementally from the other levels.

34. The circuit of claim 4 wherein at least one of the plurality of illumination intensity levels is reached incrementally from the other levels.

35. The sensor circuit of claim 7 wherein at least one of the plurality of illumination intensity levels is reached incrementally from the other levels.

36. The system of claim 27 wherein at least one of the plurality of illumination intensity levels is reached incrementally from the other levels.

37. A circuit for remotely operating a lamp at a plurality of illumination levels, the circuit comprising:
a motion sensor circuit configured to detect motion and which effects a motion sensor signal responsive to detecting the motion, the motion sensor signal being effective to set intensity levels of the lamp via a remote operation command;
a photocell sensor circuit configured to detect an ambient illumination level and which effects a photocell sensor signal responsive to the detection of light, the photocell sensor signal being effective to set intensity levels of the lamp independently from the motion sensor signal via the remote operation command;
a control circuit configured to receive the motion sensor signal and the photocell sensor signal and further configured to generate the remote operation command regardless of whether the motion sensor circuit detects motion, the remote operation command causing the illumination of the lamp to occur at one of a plurality of illumination intensity levels;
a wireless transmitter which wirelessly transmits the remote operation command to the lamp, the command being wirelessly transmitted via a unidirectional communication link from the wireless transmitter to the lamp.

38. The circuit of claim 37 wherein the command comprises an on/off data bit for commanding a plurality of illumination levels of said lamp.

39. The circuit of claim 37 wherein the command comprises a bright/dim data bit for commanding a plurality of illumination levels of said lamp.

* * * * *